US010261729B1

(12) United States Patent
Waller et al.

(10) Patent No.: US 10,261,729 B1
(45) Date of Patent: Apr. 16, 2019

(54) DOCUMENT MANIPULATION MECHANISM

(71) Applicants: Marquis G. Waller, Beverly, OH (US); Gerald Donald Boldt, Longmont, CO (US); Walter R. Albers, Broomfield, CO (US); Jeffrey Alan Sikkink, Longmont, CO (US)

(72) Inventors: Marquis G. Waller, Beverly, OH (US); Gerald Donald Boldt, Longmont, CO (US); Walter R. Albers, Broomfield, CO (US); Jeffrey Alan Sikkink, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/906,622

(22) Filed: Feb. 27, 2018

(51) Int. Cl.
| | | |
|---|---|---|
| *G06F 15/00* | (2006.01) | |
| *G06F 3/12* | (2006.01) | |
| *G06K 1/00* | (2006.01) | |
| *G06F 17/30* | (2006.01) | |

(52) U.S. Cl.
CPC .......... *G06F 3/1204* (2013.01); *G06F 3/1248* (2013.01); *G06F 3/1298* (2013.01); *G06F 17/30011* (2013.01); *G06F 17/30115* (2013.01)

(58) Field of Classification Search
CPC .... G06F 3/1204; G06F 3/1248; G06F 3/1298; G06F 17/30011; G06F 17/30115
USPC ........................................ 358/1.15, 1.14, 1.1
See application file for complete search history.

(56) References Cited

U.S. PATENT DOCUMENTS

| | | | |
|---|---|---|---|
| 8,127,012 B2 * | 2/2012 | Rai | G06Q 10/06 358/1.15 |
| 8,659,777 B2 | 2/2014 | Yokokura | |
| 8,786,888 B2 | 7/2014 | Giannetti et al. | |
| 8,854,660 B2 | 10/2014 | Evevsky | |
| 8,913,269 B2 | 12/2014 | Taima et al. | |
| 8,947,685 B2 | 2/2015 | Taima | |
| 2005/0105118 A1 | 5/2005 | Yoshida | |
| 2007/0229881 A1 * | 10/2007 | Matsubara | G06F 3/1204 358/1.15 |
| 2016/0246771 A1 | 8/2016 | Tsuji et al. | |

FOREIGN PATENT DOCUMENTS

CN 104732228 A 6/2015

* cited by examiner

*Primary Examiner* — Douglas Q Tran
(74) *Attorney, Agent, or Firm* — Jaffery Watson Medonsa & Hamilton LLC (57) ABSTRACT

A system to generate perform document optimizations is described. The system includes at least one physical memory device and one or more processors coupled with the at least one physical memory device, the one or more processors to receive data from a customer owner indicating a request to perform one or more optimizations on a document file, analyze the structure of the document file to identify one or more problems included in the document file, select one or more optimizations to be performed on the document file based on one or more problems identified in the document file and simultaneously perform the one or more optimizations to generate an optimization list corresponding to each of the one or more optimizations.

20 Claims, 6 Drawing Sheets

DOCUMENT MANIPULATION MECHANISM

FIELD

This invention relates generally to the field of print services. More particularly, the invention relates to a print services process of document optimization.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each assembly includes a printhead controller and a printhead (or array of printheads).

Recently, the establishment of infrastructures called cloud services in which services are provided by a server system connected to the Internet, has been in progress. Print services for printing over the Internet have also been provided. The services offer functions of generating and distributing print data with a server on the Internet at the request of a print device. Now, systems that provide such print services by using the aforementioned Cloud are being developed. Such systems generally use formats widely in use for digital documents to be printed. Among others, data in PDF (Portable Document Format) of Adobe® Systems Incorporated is often used.

However, it is often difficult for cloud print services to uniformly process PDF Files since there is no standard method to generate such files. Specifically, there are so many different types of PDF creation tools and devices that PDF files are rarely consistently created. PDFs files are often received from an old database after a business acquisition or from different vendors. In many cases it is difficult to print such PDF files in both the PDF-to-PostScript printing model as well as direct PDF since the PDF had not been generated properly. Currently, this problem is resolved by opening the PDF file via a software program and saving in an acceptable format. However, such a resolution is impractical since it is not capable of being automated on a server platform.

Accordingly, a mechanism to efficiently process PDF files at a cloud print services environment is desired.

SUMMARY

In one embodiment, a method is disclosed. The method includes receiving a request to perform one or more optimizations on a document file, analyzing the structure of the document file to identify one or more problems included in the document file, selecting one or more optimizations to be performed on the document file based on one or more problems identified in the document file and simultaneously perform the one or more optimizations to generate an optimization list corresponding to each of the one or more optimizations.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

A document manipulation mechanism implemented in a cloud print services environment is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
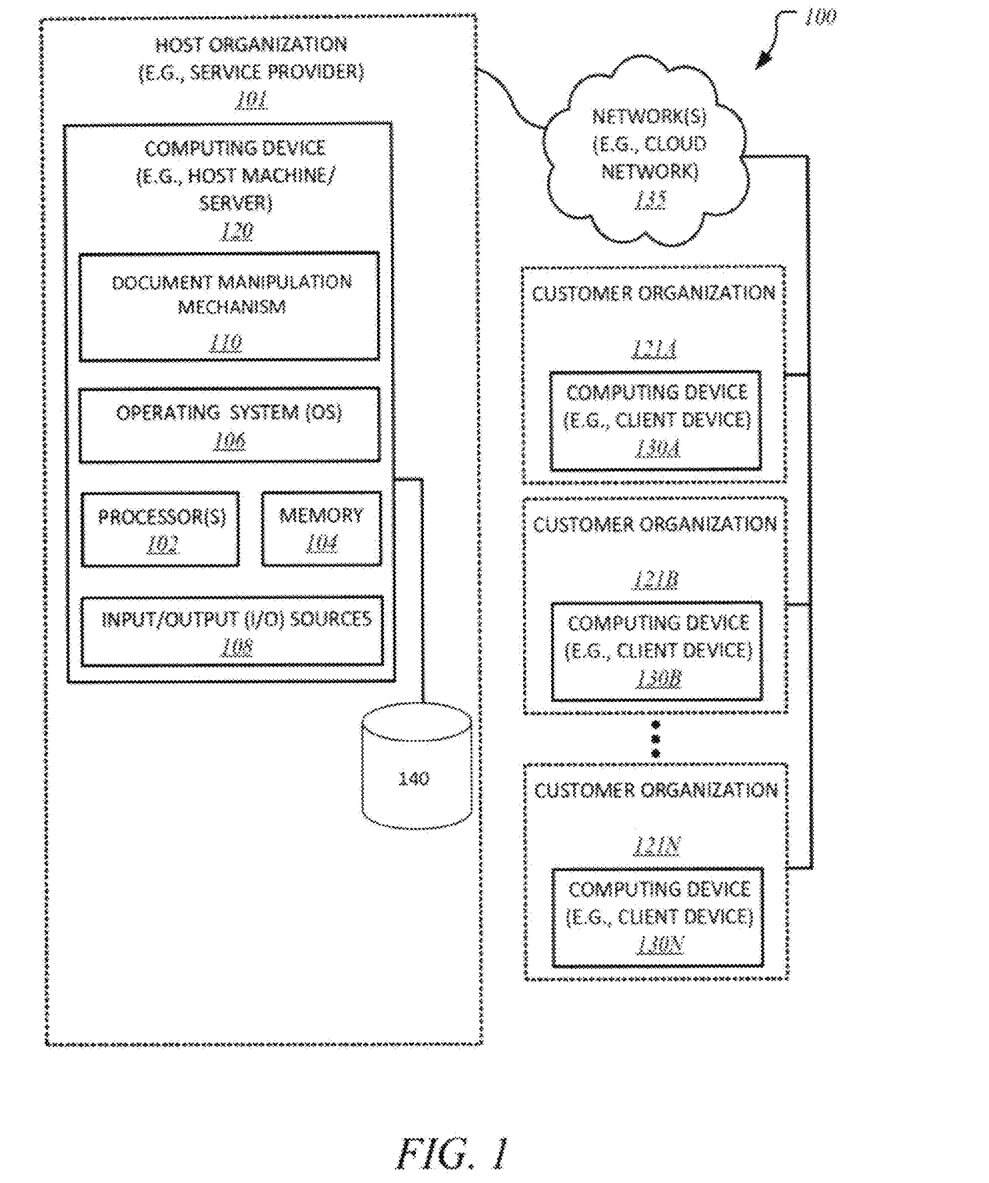
FIG. 1 illustrates a system having a computing device employing a document manipulation mechanism according to one embodiment.

FIG. 1 illustrates a system 100 having a computing device 120 employing a document manipulation mechanism 110 according to one embodiment. In one embodiment, computing device 120 includes a host server computer serving as a host machine for employing document manipulation mechanism 110 to facilitate the processing of PDF documents for printing at a printing service. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process documents and/or print jobs on behalf of customer organizations 121A-N. In some embodiments, host organization 101 receives input and other requests from a plurality of customer organizations 121A-N over one or more networks 135; for example, incoming print job and/or document processing requests, or other inputs may be received from customer organizations 121A-N to be processed using database system 140.

In one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101. For example, incoming requests received at the web server may specify print services from host organization 101 are to be provided. Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

Figure 2:
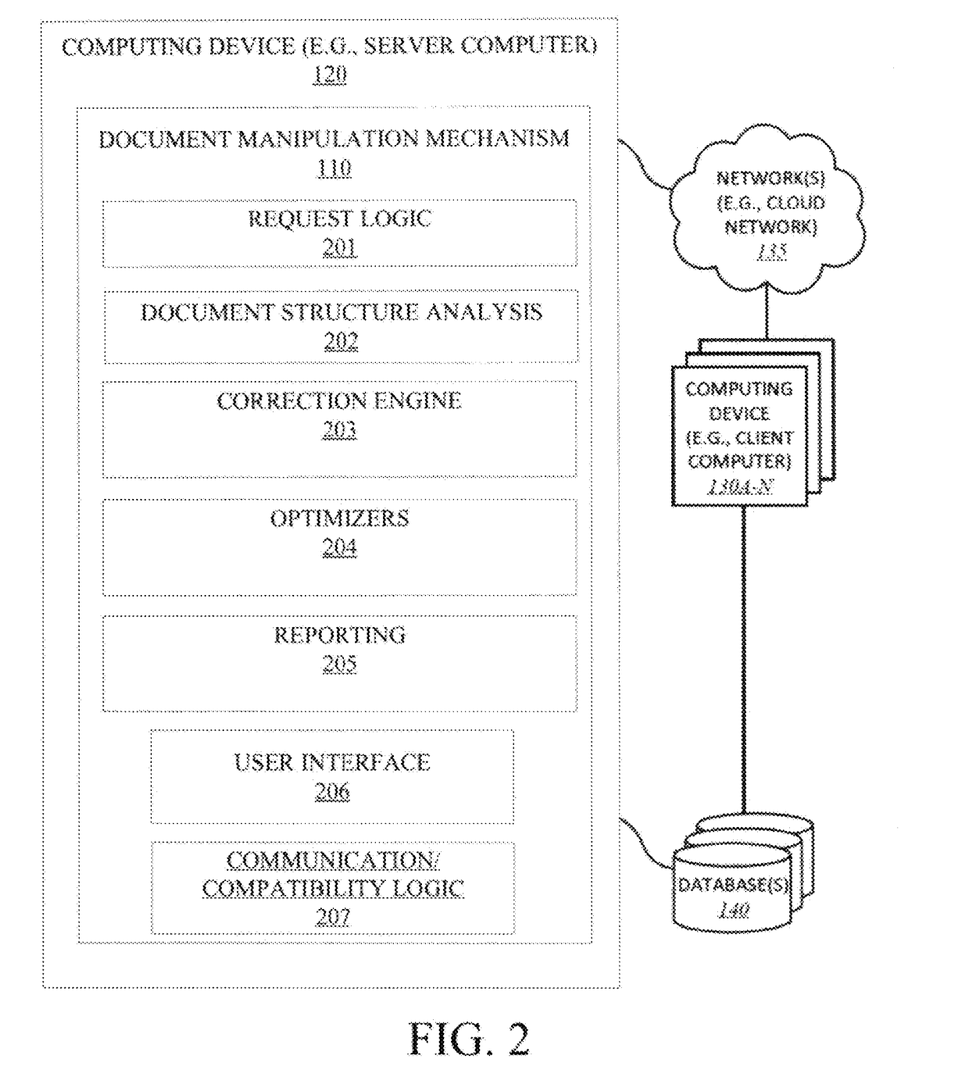
FIG. 2 illustrates a document manipulation mechanism according to one embodiment.

FIG. 2 illustrates document manipulation mechanism 110 of FIG. 1 according to one embodiment. In one embodiment, document manipulation mechanism 110 may include any number and type of components, such as request logic 201, structure analysis engine 202, correction engine 203, optimizers 204, reporting engine 205, user interface 206 and communication/compatibility logic 207.

In one embodiment, computing device 120 may include a server computer which may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 130A-N, over one or more networks, such as network(s) 135.

In one embodiment, computing device 120 may serve as a service provider core for hosting and maintaining document manipulation mechanism 110 as a software as a service (SaaS), and be in communication with one or more client computers 130A-N, over one or more network(s) 135, and any number and type of dedicated nodes. As aforementioned, with respect to FIG. 1, any number and type of requests may be received at or submitted to request logic 201 for processing. For example, incoming requests may specify which services from computing device 120 are to be provided, such as document processing requests, on behalf of one or more client devices 130A-N, code execution requests, and so forth.

Figure 3:
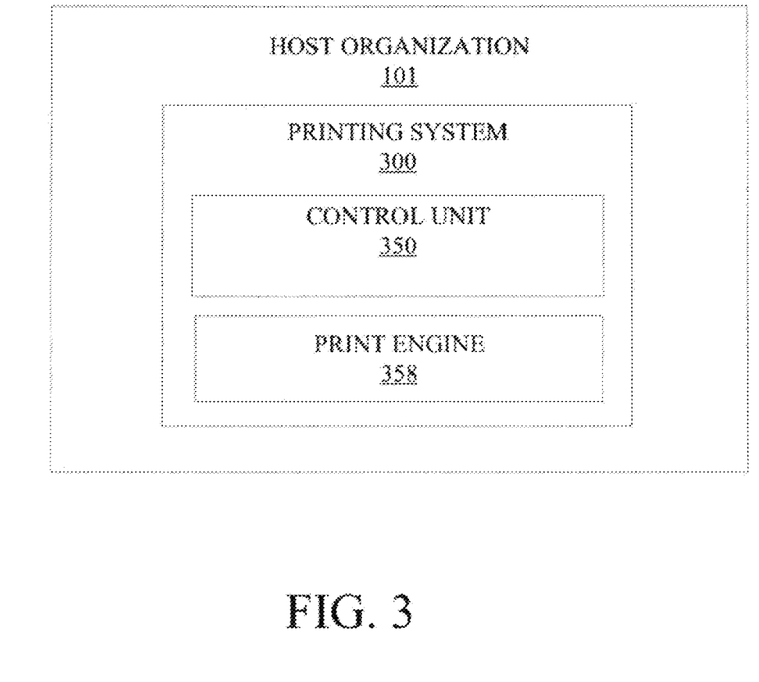
FIG. 3 illustrates one embodiment of a printing system.

According to one embodiment, host organization 101 may perform print services for client devices 130 via one or more printing systems. FIG. 3 illustrates one embodiment of such a printing system 300. Printer 300 includes a control unit 350 and a print engine 358. According to one embodiment, control unit 350 processes and renders objects received in print job data and provides sheet maps for printing to print engine 358. Control unit (e.g., DFE or digital front end) 350 is implemented to process image objects received at control unit 350 by a raster image processor (RIP) to convert an image described in a vector graphics format (e.g., shapes) into a raster image (e.g., pixels) that is to be stored as scan line data in a memory array (not shown) for output to print engine 358. In other embodiments, print engines 358 may be located at a facility associated with a customer organization 121. In such embodiments, control unit 350 processes print job information and transmits the raster images to remote print engines to produce the output.

Referring back to FIG. 2, document manipulation mechanism 110 may be implemented to perform optimizations on PDF files received from one or more customer organizations 121. In such an embodiment, document manipulation mechanism 110 executes one or more PDF tools and/or scans (e.g., Adobe® Acrobat®, Enfocus® PitStop®, etc.) to identify one or more formatting problems, and optimize (e.g., make corrections, remove embedded fonts, down sampling color images, etc.) with a PDF file. In a further embodiment, the optimizations are performed in parallel.

In one embodiment, computing device 120 may implement request logic 201 to serve as a request interface via a web server or as a stand-alone interface, such as user interface 206, to receive requests packets or other requests from the client devices 130A-N. The request interface may further support the return of response packets or other replies and responses in an outgoing direction from computing device 120 to one or more client devices 130A-N.

In a further embodiment, request logic 201 receives requests from a customer organization to perform one or more optimizations on a PDF file submitted to computing device 120. In this embodiment, the request may comprise optimization specifications including one or more problems with a PDF file that are to be identified and optimized. Additionally, the optimization specifications may include various optimization criteria, such as a type of printer at which the PDF is to be printed on (e.g., printing system 300), color scaling, font restrictions, etc.

In one embodiment, structure analysis engine 202 analyzes the structure of the received PDF file to identify whether there are any problems (e.g., structural or syntax). In such an embodiment, PDF structure may include various structural items in the PDF (e.g., images, fonts, types of fonts, size of art and crop boxes and contents and positions of various elements), color requirements, annotations, structure trees, forms, content streams, etc. Thus, the structure analysis performed by structure analysis engine 202 enables selection of one or more optimization tools to be implemented for optimization of the PDF.

In one embodiment, correction engine 203 selects one or more optimizations that are to be implemented based on the structure analysis. In this embodiment, correction engine 203 determines optimizations by comparing structural characteristics of the received PDF with structural characteristics of PDFs that have previously been processed and stored (e.g., at database(s) 140). Optimizations that were performed for previously processed PDFs are identified and used for the current PDF optimization upon a determination that the received PDF includes structural characteristics that are similar to previously optimized PDFs.

In a further embodiment, correction engine 203 uses optimization criteria received in the request to determine optimizations that are to be implemented. For instance, if a received request includes requests regarding color coverage of a page, and 50% reduction, only a subset of optimization tools selected based on the structural analysis (e.g., 2 of the 4 tools) may be needed to perform optimization.

In yet a further embodiment, correction engine 203 may select a full suite of optimization tools to optimize a PDF upon a determination that the PDF includes one or more unique structural characteristics (e.g., characteristics previously unencountered by document manipulation mechanism 110). Once optimized, the characteristics and the corresponding optimizations that were effective processing those structural characteristics are stored and used for subsequent optimizations upon receiving subsequent PDFs having the same characteristics. Thus, document manipulation mechanism 110 enable more efficient PDF optimization with the more PDF files that are processed.

Figure 4:
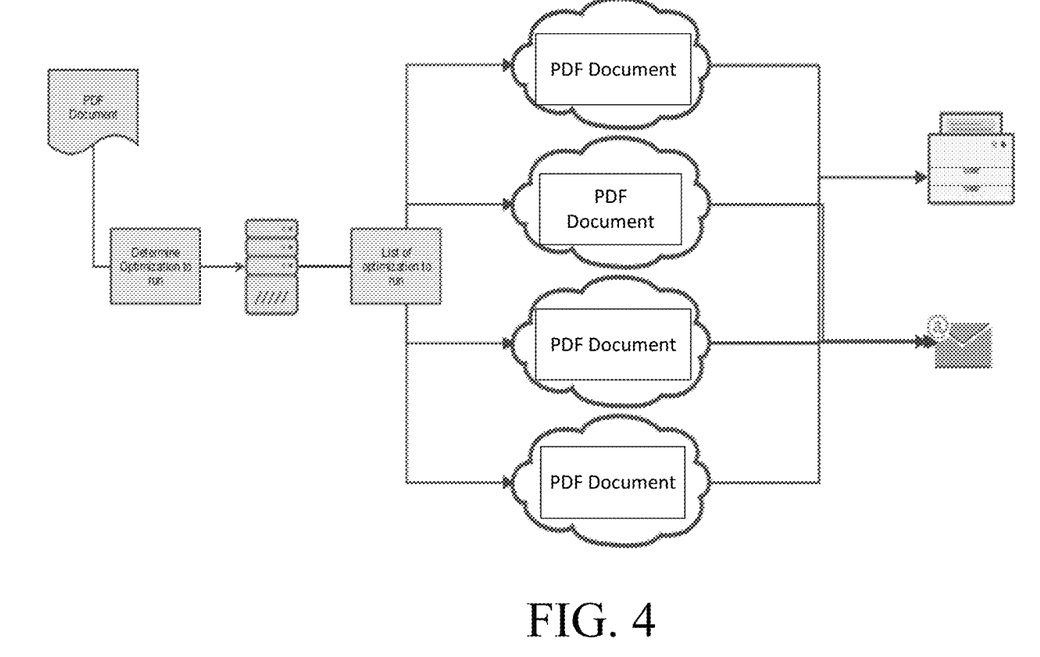
FIG. 4 illustrates another embodiment of a document manipulation mechanism implemented in a cloud computing environment.

Optimizers 204 perform the selected optimizations on the PDF. In one embodiment, each selected optimization is performed simultaneously in parallel using independent microservices, which results in a reduction in processing. FIG. 4 illustrates one embodiment of optimizations performed via microservices. In a further embodiment, the results of the optimizations may be analyzed and combined on upon a detection of overlapping issues that may be further optimized to generate an optimum PDF.

In one embodiment, reporting engine 205 provides an optimization list for each performed optimization, the results of each optimization to a customer owner, along with any recommended optimization provided by document manipulation mechanism 110. As shown in FIG. 4, the optimization results may be delivered directly to the customer owner, or via a virtual printer facility, which simulates the printing of documents according to each optimization. A virtual printer facility produce real data from received optimization lists in order to provide real production information on how the job will be produced. In other embodiments, the customer owner may communicate a selection of a preferred optimization, which is stored and used for subsequent optimization requests received for the client.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

Figure 5:
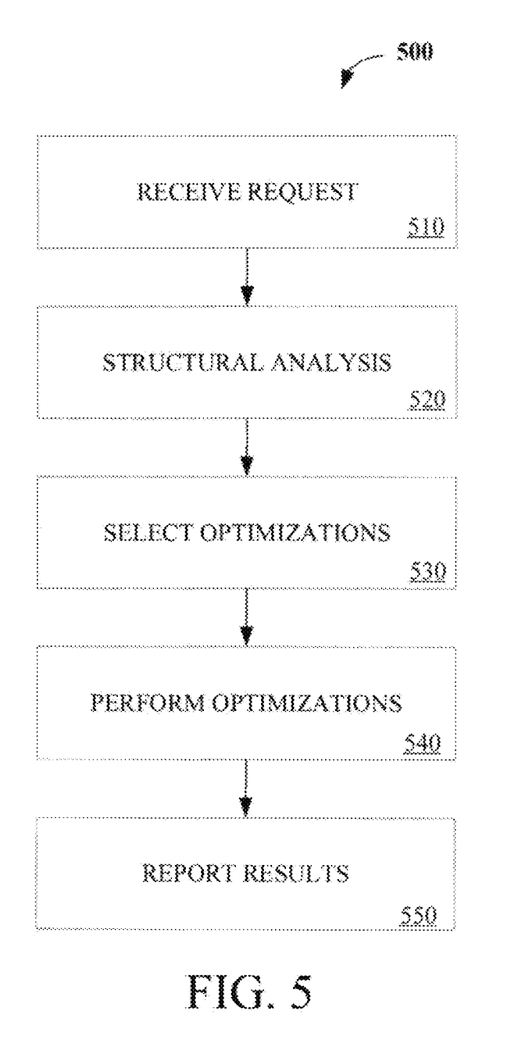
FIG. 5 is a flow diagram illustrating one embodiment of a method for performing document manipulation.

FIG. 5 is a flow diagram illustrating one embodiment of a process 500 to manipulate a PDF document. Process 500 may be performed by processing logic that may comprise hardware (e.g., circuitry, dedicated logic, programmable logic, etc.), software (such as instructions run on a processing device), or a combination thereof. In one embodiment, process 500 may be performed by document manipulation mechanism 110. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where an optimization request is received from a customer owner, including a PDF file and any optimization specifications. At processing block 520, the structure of the PDF is analyzed. At processing block 530, a list of optimizations are selected based on the structure analysis and/or optimization criteria included in the request. At processing block 540, the optimizations are performed. As discussed above, the optimizations are performed in parallel via individual microservices. At processing block 550, the optimization results are reported to the customer owner, along with any specific recommendations.

Figure 6:
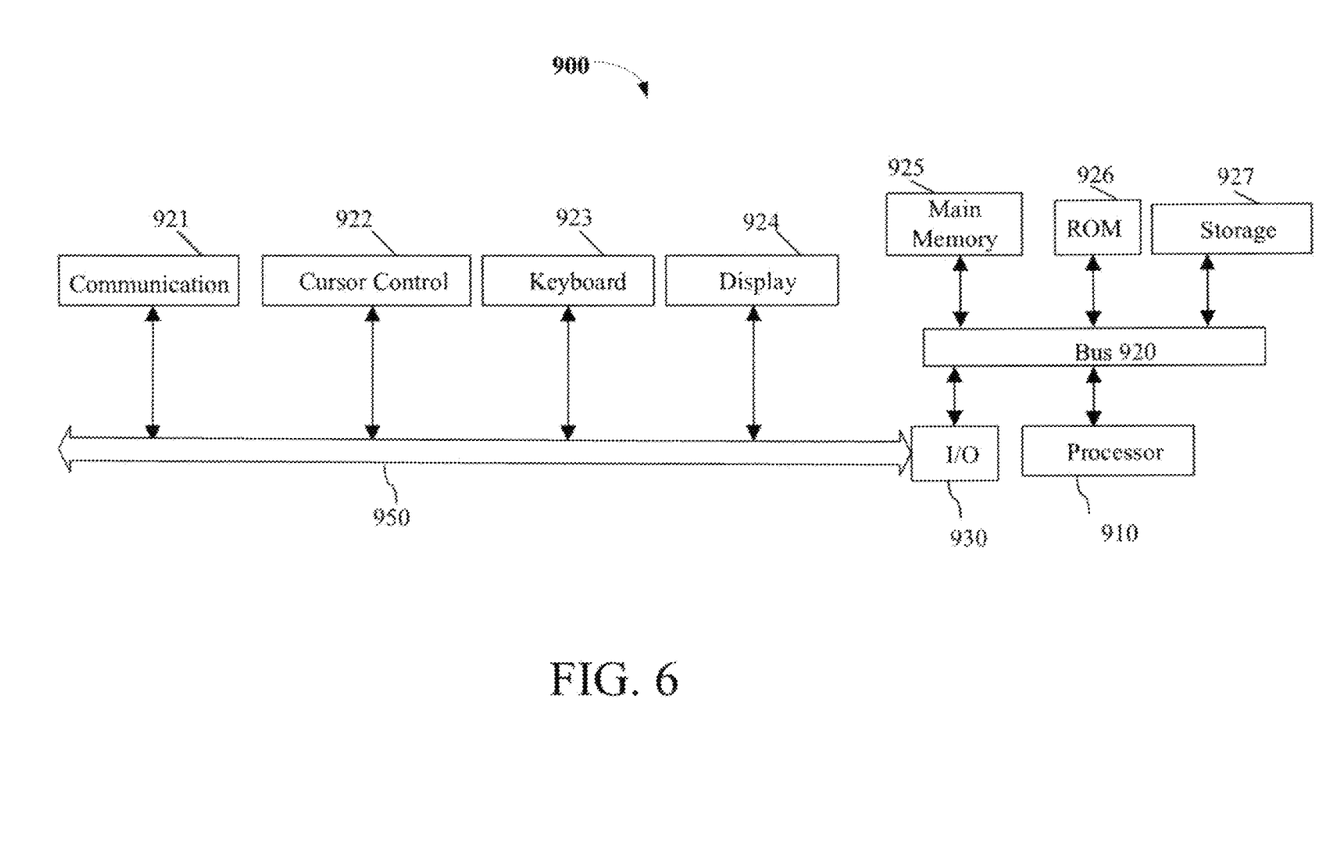
FIG. 6 illustrates a computing device suitable for implementing embodiments of the present disclosure.

FIG. 6 illustrates a computer system 900 on which computing device 120 and/or 121 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A non-transitory computer-readable medium having stored thereon instructions that, when executed by one or more processors, cause the one or more processors to:
   receive a document file;
   receive a request to perform one or more format optimizations on the document file;
   analyze a structure of the document file to identify one or more format problems included in the document file;
   select one or more format optimizations to be performed on the document file based on one or more format problems identified in the document file; and
   simultaneously perform the one or more format optimizations on the document file to generate an optimization list indicating the one or more format optimization that have been performed.

2. The computer-readable medium of claim 1, wherein the request comprises optimization specifications indicating one or more problems with the document file.

3. The computer-readable medium of claim 2, wherein the optimization specifications comprise optimization criteria.

4. The computer-readable medium of claim 3, wherein the optimization criteria include information regarding a printer on which the documented file is to be printed.

5. The computer-readable medium of claim 3, wherein the one or more format optimizations are selected by comparing structural characteristics of the document file with structural characteristics of previously processed document files and corresponding optimization results.

6. The computer-readable medium of claim 5, wherein format optimizations implemented for a first set of previously received document files are selected for the one or more format optimizations upon a determination that the structural characteristics of the document file is similar to structural characteristics of the first set of previously received document files.

7. The computer-readable medium of claim 5, wherein the one or more format optimizations are further selected based on optimization criteria received in the optimization specifications.

8. The computer-readable medium of claim 5, wherein the one or more format optimizations are performed in parallel at a corresponding microservice.

9. The computer-readable medium of claim 5, further comprising instructions that, when executed by the one or more processors, cause the one or more processors to report a result of each of the one or more format optimizations.

10. The computer-readable medium of claim 9, wherein the report comprises generating a simulation of a printed output of each of the one or more format optimizations.

11. A system comprising:
    at least one physical memory device; and
    one or more processors coupled with the at least one physical memory device, the one or more processors to receive data from a customer owner including a document file and a request to perform one or more format optimizations on the document file, analyze a structure of the document file to identify one or more format problems included in the document file, select one or more format optimizations to be performed on the document file based on one or more format problems identified in the document file and simultaneously perform the one or more format optimizations on the document file to generate an optimization list indicating the one or more format optimization that have been performed.

12. The system of claim 11, wherein the request comprises optimization specifications indicating one or more problems with the document file.

13. The system of claim 12, wherein the optimization specifications comprise optimization criteria.

14. The system of claim 13, wherein the optimization criteria include information regarding a printer on which the documented file is to be printed.

15. The system of claim 13, wherein the one or more format optimizations are selected by comparing structural characteristics of the document file with structural characteristics of previously processed document files and corresponding optimization results.

16. The system of claim 15, wherein format optimizations implemented for a first set of previously received document files are selected for the one or more format optimizations upon a determination that the structural characteristics of the document file is similar to structural characteristics of the first set of previously received document files.

17. The system of claim 15, wherein the one or more format optimizations are further selected based on optimization criteria received in the optimization specifications.

18. The system of claim 15, wherein the one or more format optimizations are performed in parallel at a corresponding microservice.

19. The system of claim 15, wherein the one or more processors are further configured to report a result of each of the one or more format optimizations.

20. The system of claim 19, wherein the report comprises generating a simulation of a printed output of each of the one or more format optimizations.

* * * * *